July 28, 1925.
W. K. STURROCK
1,547,462
SPRING BRACE FOR BROKEN SPRINGS OF AUTOMOBILES AND TRUCKS
Filed July 28, 1924
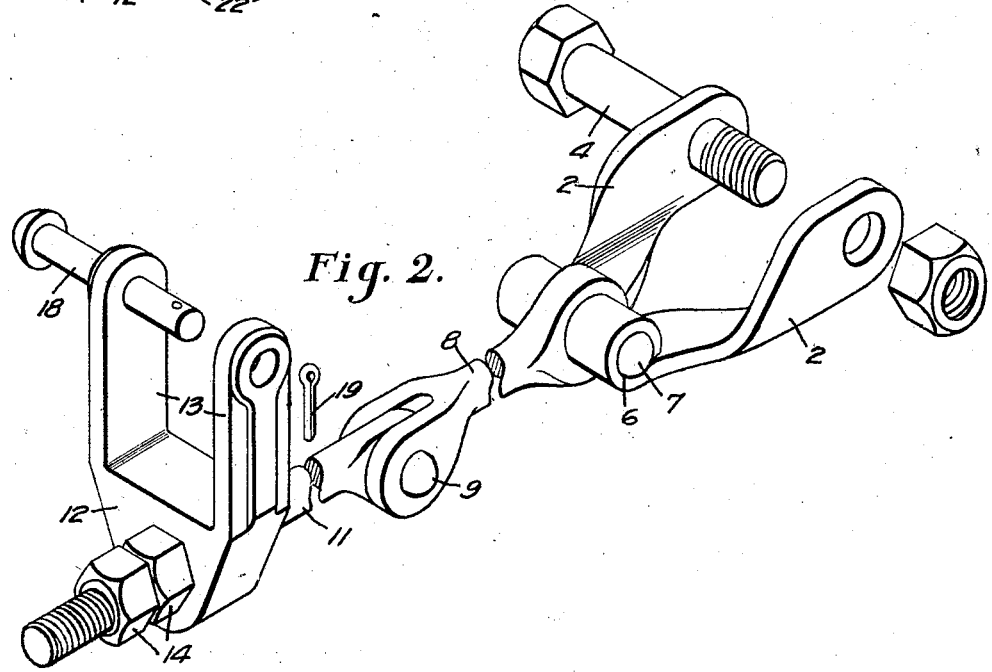
INVENTOR
William K. Sturrock
BY    HIS ATTORNEYS Patented July 28, 1925.

1,547,462

UNITED STATES PATENT OFFICE.

WILLIAM K. STURROCK, OF LIVINGSTON, CALIFORNIA.

SPRING BRACE FOR BROKEN SPRINGS OF AUTOMOBILES AND TRUCKS.

Application filed July 28, 1924. Serial No. 728,540.

*To all whom it may concern:*

Be it known that I, WILLIAM K. STURROCK, a citizen of the United States, residing at Livingston, in the county of Merced and the State of California, have invented a new and useful Spring Brace for Broken Springs of Automobiles and Trucks, of which the following is a specification.

One of the objects of my invention is to provide a readily applied tie between the axle and spring bolt in the event of a broken main leaf of a rear spring. The device is applicable to any car using what is known as the "Hotchkiss drive" and wherein the rear springs are slung beneath the axle, and may be used either forward of or to the rear of the axle.

One form of the invention is illustrated in the accompanying drawing, in which:

Figure 1 is a side view of the device as applied to a broken spring;

Figure 2 is a perspective view of the several parts of the device.

In broad terms my invention comprises means readily interposed between the axle of the vehicle and the end bolt of a broken spring or the spring bracket to retain the broken leaves in working position temporarily until permanent repairs may be made.

In detail my brace comprises a pair of clips 2 adapted to be attached to the spring bracket 3 by a bolt 4, which is slipped into the place vacated by the old spring bolt. The clips 2 which are really links are formed of flat stock apertured at one end for the spring bolt, and twisted and turned at the other end to provide alined eyes 6, thru which pass a pivot pin 7. Pivotally connected to the clip links by this pivot pin and lying between the eyes 6, is a link 8 pivotally connected by the pivot pin 9 to a second link 11, which passes loosely thru the butt end 12 of a clevis provided with the arms 13. The end of the link 11 is threaded to receive the nuts 14, one of which is a lock nut, and which are used to place the links under tension when the device is applied.

The arms 13 of the clevis are adapted to be slipped over the sides of the spring 16 on the side of the axle 17 farthest from the broken portions of the spring. A pin 18 thru the end of the clevis arms, and held by the cotter pin 19, retains the clevis in position. For purposes of illustration it may be assumed that two of the leaves of the spring are broken at points marked by the reference character 20.

In applying the device when leaves of the spring are broken, the clevis is seated on the spring and anchored against the plate 21, held on the bottom portion of the spring by the U-bolts 22 which secure the axle and spring together.

When the device is applied as shown in Figure 1 and the nuts 14 are tightened, the leaves of the spring which are broken are held together in their original position, so that the spring, though not so good as a whole spring, is enabled to function temporarily until permanent repairs can be made.

While I have shown in the drawings a device designed for application to a particular type of spring, it will be readily understood, without special illustration, that suitable variation in the end members of my device will permit its application to other forms of springs.

When not in use my spring brace is readily foldable into small compass by reason of the pivotal connection between the links, and may be kept in the tool box or other convenient place.

I claim:

1. A spring brace for broken springs of vehicles comprising a tension link, means for securing one end of the link to the spring bracket and the other end to the axle structure, and means for causing a tensional stress in said link.

2. A spring brace for broken springs of vehicles comprising a pair of pivotally connected tension links, means for anchoring one of the links against the axle structure, and means for connecting the other link to the spring bracket.

3. A spring brace for broken springs of vehicles comprising pivotally connected tension links, a clevis slidably mounted on one of said links and adapted to be mounted on the spring on the side of the axle opposite the break, means for adjusting the position of the clevis on its link, and means for attaching the other end of the connected links to the spring bracket.

In testimony whereof I have hereunto set my hand.

WILLIAM K. STURROCK.